(12) United States Patent
Swanson et al.

(10) Patent No.: US 8,775,219 B2
(45) Date of Patent: Jul. 8, 2014

(54) SPECTRAL IMAGE CLASSIFICATION OF ROOFTOP CONDITION FOR USE IN PROPERTY INSURANCE

(75) Inventors: Aaron L. Swanson, Long Beach, CA (US); Mark C. Helmlinger, Glendora, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 62 days.

(21) Appl. No.: 13/548,878

(22) Filed: Jul. 13, 2012

(65) Prior Publication Data

US 2014/0019166 A1 Jan. 16, 2014

(51) Int. Cl.
G06Q 40/00 (2012.01)
G06Q 40/08 (2012.01)

(52) U.S. Cl.
CPC ................................. *G06Q 40/08* (2013.01)
USPC ............................................................ 705/4

(58) Field of Classification Search
USPC ............................................. 705/4; 702/156
See application file for complete search history.

(56) References Cited

U.S. PATENT DOCUMENTS

| | | | |
|---|---|---|---|
| 7,317,416 B2 | 1/2008 | Flom et al. | |
| 7,944,559 B2 | 5/2011 | Oskotsky et al. | |
| 8,346,578 B1 * | 1/2013 | Hopkins et al. | 705/4 |
| 2008/0262789 A1 * | 10/2008 | Pershing et al. | 702/156 |
| 2009/0265193 A1 * | 10/2009 | Collins et al. | 705/4 |
| 2009/0326383 A1 | 12/2009 | Barnes et al. | |

FOREIGN PATENT DOCUMENTS

| | | |
|---|---|---|
| CN | 102081039 | 6/2011 |
| WO | 2011/155888 | 12/2011 |

OTHER PUBLICATIONS

C. M. Marino et al.; Airborne hyperspectral remote sensing applications in urban areas: asbestos concrete sheeting identification and mapping; Remote Sensing and Data Fusion over Urban Areas, IEEE/ISPRS Joint Workshop 2001; pp. 212-216.
J. Meola et al; Detecting Changes in Hyperspectral Imagery Using a Model-Based Approach; IEEE Transactions on Geoscience and Remote Sensing; Jul. 2011; RYMT, Air Force Res. Lab., Wright-Patterson AFB, OH, USA vol. 49 , Issue: 7, pp. 2647-2661.
J. Zhu et al; Identification for building surface material based on hyperspectral remote sensing; 19th International Conference on Geoinformatics, 2011; Date of Conference: Jun. 24-26, 2011; Inst. of Spatial Inf. Tech., Zhejiang Univ., Hangzhou, China.

(Continued)

*Primary Examiner* — Samica L Norman
(74) *Attorney, Agent, or Firm* — Carmen Patti Law Group, LLC (57) ABSTRACT

A method and apparatus is disclosed for applying high resolution spectral imaging (hyperspectral or multispectral) to property characterization, specifically rooftop classification of type and condition using reference data for insurance applications. The system can also be used to classify the condition of vegetation and property hazards. Classifying rooftop type and condition using remote spectral imaging greatly improves quantitative accuracy of roof inspections and decreases the cost of inspection across large geographic domains. By comparing the spatially subset spectral reflection of rooftops to a reference spectra, the rooftop type and condition can be accurately assessed. The aerial inspection produces uniform and consistent data can be ingested into property insurance evaluations for many different uses. The cost of residential property inspections and re-inspections performed via manual visual inspection is reduced and a geospatial database for the targeted residential and commercial property region that can be used for sustained property assessment is created.

20 Claims, 9 Drawing Sheets

(56) References Cited

OTHER PUBLICATIONS

D. Slater et al.; Material classification for 3D objects in aerial hyperspectral images; IEEE Computer Society Conference on Computer Vision and Pattern Recognition, 1999; pp. 268-273; Dept. of Electr. & Comput. Eng., California Univ., Irvine, CA.

B.D. Bue et al; Automated Labeling of Materials in Hyperspectral Imagery; IEEE Transactions on Geoscience and Remote Sensing; Nov. 2010; Dept. of Electr. & Comput. Eng., Rice Univ., Houston, TX, USA vol. 48 , Issue: 11, pp. 4059-4070.

A. Brook et al; Fusion of hyperspectral images and LiDAR data for civil engineering structure monitoring; 2nd Workshop on Hyperspectral Image and Signal Processing: Evolution in Remote Sensing (WHISPERS), 2010; Remote Sensing Lab., Tel-Aviv Univ., Tel-Aviv, Israel.

D. Lemp et al; Segment-based characterization of roof surfaces using hyperspectral and laser scanning data; Geoscience and Remote Sensing Symposium, 2005. IGARSS '05. Proceedings. 2005 IEEE International; vol. 7, pp. 4942-4945.

S. Resta et al; Detection of small changes in airborne hyperspectral imagery: Experimental results over urban areas; 6th International Workshop on the Analysis of Multi-temporal Remote Sensing Images (Multi-Temp); 2011; Dipt. di Ing. dell'Inf., Univ. di Pisa, Pisa, Italy.

K. Chen et al; Extracting building features from high resolution aerial imagery for natural hazards risk assessment Geoscience and Remote Sensing Symposium, 2002. IGARSS '02. 2002 IEEE International; Risk Frontiers-Natural Hazards Res. Centre, Macquarie Univ., North Ryde, NSW, Australia; pp. 2039-2041; vol. 4.

M. Mueller et al; Discrimination between roofing materials and streets within urban areas based on hyperspectral, shape, and context information; 2nd GRSS/ISPRS Joint Workshop on Remote Sensing and Data Fusion over Urban Areas, 2003; GeoForschungsZentrum Postdam, Potsdam, Germany.

R. Ayuga et al; Hyperspectral Remote Sensing Application for Semi-Urban Areas Monitoring; Urban Remote Sensing Joint Event, 2007; Obs. de la Tierra, Teledeteccion y Atmosfera, Inst. Nat. de Tec. Aeroespacial (INTA), Torrejon de Ardoz.

E. Taherzadeh et al; Using hyperspectral remote sensing data in urban mapping over Kuala Lumpur; Joint Urban Remote Sensing Event (JURSE), 2011; Inst. of Adv. Technol. (ITMA), Univ. Putra Malaysia (UPM), Serdang, Malaysia; pp. 405-408.

F. Dell'Acqua et al; Exploiting spectral and spatial information in hyperspectral urban data with high resolution; Geoscience and Remote Sensing Letters, IEEE; Date of Publication: Oct. 2004; Dept. of Electron., Univ. of Pavia, Italy vol. 1 , Issue: 4, pp. 322-326.

M. Alonso et al; The Combination of Three Statistical Methods for Visual Inspection of Anomalies in Hyperspectral Imageries; Seventh International Conference on Advances in Pattern Recognition, 2009. ICAPR '09; Dept. of Math., Univ. of Alcala, Alcala de Henares; pp. 377-380.

\* cited by examiner

| Brand | Color | Solar Reflectance, Initial | Solar Reflectance, 3 years | Thermal Emittance, Initial | Thermal Emittance, 3 years |
|---|---|---|---|---|---|
| Roof A1 | Off-White | 0.26 | pending | 0.85 | pending |
| Roof A2 | White | 0.26 | pending | 0.85 | pending |
| Roof A3 | Light Brown, gray, | 0.27 | 0.26 | 0.91 | 0.81 |
| Roof B1 | White | 0.25-0.27 | 0.28 | 0.89-0.94 | 0.91 |
| Roof B2 | Several | 0.26 | 0.28 | 0.89 | 0.91 |
| Roof B2 | Green | 0.27 | pending | 0.90 | pending |
| Roof B2 | Grey | 0.27 | 0.30 | 0.89 | 0.90 |
| Roof B2 | Tan | 0.27 | 0.28 | 0.89 | 0.91 |

SPECTRAL IMAGE CLASSIFICATION OF ROOFTOP CONDITION FOR USE IN PROPERTY INSURANCE

FIELD OF THE INVENTION

This invention relates to using remote sensing capabilities like hyperspectral imaging to identify roof characteristics for insurance purposes.

BACKGROUND

Property insurance liability is driven, in large part, by the replacement cost of residential property damaged by weather and natural disasters. Of property damaged, roofs and roofing materials represent the largest fraction of losses, especially in weather prone regions, such as Central and Eastern United States. When insurers are writing a policy on an individual property, the real value roof replacement cost is often not known and can be greatly misrepresented if the condition of the roof is poor, old, or otherwise degraded. When assessing a replacement value, knowledge of rooftop condition is important because natural hazards, such as wind, hail, and extreme heat, pose a much higher risk of causing significant damage to old or aged roof material versus younger or unweathered roof material that posses more structural integrity to withstand damaging events. Although insurers prefer to assess liability and roof replacement cost through visual inspection, they are often unable to assess the true nature of a roofs condition because of the inability to obtain a visual inspection of each property prior to writing an insurance policy. This is because of the high initial cost of the manual inspection, the lack of timeliness in obtaining inspection, and often because of the lack of reproducibility between different inspectors. When manual visual inspections can be carried out, they usually are conducted by a relatively small number of inspectors over very large geographic domains, including large urban to suburban areas. This causes inspections to be slow and expensive.

Manual visual inspection, while usually very accurate due to up-close inspection, also results in qualitative findings that are inherently variable because they are dependent upon a group of independent inspectors. The variability of independent inspectors impacts both geographic and long-term precision of inspection results, and relegates the use of inspections to a static determination of rooftop value. This further impairs an accurate determination of the true liability due to roof replacement costs. In times of natural disaster response and recovery, speed of inspection and reporting often requires large numbers of independent inspection agencies, that can further reduce reproducibility and accuracy of the inspection. In such events, the inspectors are incentivized by number of reports completed, further decreasing accuracy and thoroughness of inspections.

Currently, classifying the condition of a rooftop requires visual manual inspection at close range to assess weathering, granule wear, and an estimate of age and overall condition of roof, including any damage. Manual inspection is conducted by driving to the geographic location, obtaining permission from the prperty owners to mount the structure, then setting up a ladder to climb onto the roof. Once on the roof the actual inspection only takes a few minutes to inspect shingle condition and take high resolution pictures. Roof condition with regards to general age and damage is typically documented in written form and accompanied by color pictures that document the physical state of wear. Digital images must be tagged to the physical report documenting the roof condition for insurers.

For insurance purposes data must be captured on properties geographically dispersed over large areas requiring multitudes of independent inspectors. Quantitative tools to classify roof conditions can include handheld spectral imagers, which would increase consistency of results, but would add additional cost because of the sophisticated analysis required and the additional time to acquire the spectral images. Robotic inspections of rooftops could remove inspector requirements for climbing and mounting rooftops, but would not remove the time required at each property, but increase it, nor would it address the significant geographic distribution of properties of interest.

For insurance applications, remote sensing is the optimal methodology for quantifying large areas at low cost. Currently applications of color digital imagery and color-infrared imagery are used to document home properties for location information, but can only provide qualitative information on what type of roof is present on the structure, not its current state or condition. The qualitative identification of roof type also requires at least 4-6 inch GSD (ground sample distance) imagery to make an approximation for roof type ID. To obtain 4-6 inch imagery low altitude airborne systems must be flown across the target area, which represents a high cost option for only a qualitative estimate. Stereo imagery, including oblique imagers, capture the same resolution digital color images and can be used for constructing 3-dimension views and wire frames of property structures, but cannot detail the condition of the roof material. HyperSpectral Imaging (HSI) or Multi-Spectral Imaging (MSI) methods, both of which obtain high spectral resolution (1-20 nm bandwidths), have been applied for locating and identifying materials of economic and military value as stated in U.S. Pat. No. 6,008,492 to Sater et al. (Hyperspectral Imaging Method and Apparatus). Other future advances in active remote sensing such as multi-wavelength LIDAR or synthetic aperture radar (SAR) have not been developed or demonstrated yet. At this point only spectral imagers can characterize the changes in new to aged physical conditions caused by weather and other events. However, no HSI/MSI system has been developed to provide a comprehensive solution to the problem of roof inspections for property insurance liability purposes.

Thus, a need exists to lower the cost of inspections and increase the reliability of roof condition knowledge.

SUMMARY

The new advancement in this invention is the application of high resolution spectral imaging (hyperspectral or multispectral) to property characterization, specifically rooftop classification of type and condition using reference data for insurance applications. The system can also be used to classify the condition of vegetation and property hazards. Classifying rooftop type and condition using remote spectral imaging greatly improves quantitative accuracy of roof inspections and decreases the cost of inspection across large geographic domains. The applied use of aerial inspection can image a large geographic area, covering 10's to 100's of square miles over a few days, accurately mapping spectral reflectance against spatial location using conventional location intelligence (GPS) technology. By comparing the spatially subset spectral reflection of rooftops within the scene to a reference spectra, the rooftop type and condition of wear can be accurately assessed. The aerial inspection uses a standardized methodology that produces uniform and consistent results across all the subject areas. Data can then be ingested into property insurance evaluations for many different uses. The end result is to greatly decrease the cost of residential property inspections and reinspections that are traditionally performed via manual visual inspection, as well as, creating a geospatial databasee for the targeted residential and commercial property region that can be used for detailed and sustained property assessment analysis. The areal inspections will greatly decrease the cost, while improving the accuracy of rooftop liability assessments across large geographic distributions compared with currently manual methods.

In one embodiment, the invention is a method for aerially assessing roof type and conditions in a geographic area to determine property liability having the steps of creating a database of spectral information for roof materials found in the geographic area, building a model of the geographic area to identify roof objects using aerial photos, mapping the geographic area using an airborne hyperspectral or multispectral imager to collect high resolution aerial spectral images, measuring requisite geopositional data to accurately locate aerial imagery to geographic area of interest, analyzing the high resolution aerial spectral images to characterize the condition of roof objects according to the geographic property model by comparing the images with the reference spectral information from the database, associating the roof objects with geographic identifications of specific properties and developing property liability assessments for the specific properties based on the comparisons.

In another embodiment, the invention is a system for assessing roof conditions to determine property liability having one or more databases for storing spectral information for roof materials, said spectral information including at least one of aging impacts on roof material, weathering impacts on roof material, vegetation impacts on roof material, storm impacts on roof material, or solar radiation impacts on roof material, an airborne spectral imager for collecting spectral images of a geographic area, and a processor for building a geospatial model of the geographic area to identify roof objects, for analyzing the spectral images to characterize the condition of roof objects identified by the model by comparing the roof objects with reference spectral information stored in the database, associating the roof objects with geographic identifications of specific properties and for developing property liability assessments based on the comparisons.

In a further embodiment, the invention is a property insurance liability assessment business method having the steps of creating a database of spectral information for roof materials found in the geographic area, building a model of the geographic area to identify roof objects using digital aerial photography, mapping the geographic area using an airborne spectral imager to collect hyperspectral images, analyzing spectral images to characterize the condition of roof objects according to the model by comparing the spectral images with the reference spectral information from the database, associating the roof objects with geographic identifications of specific properties and developing property liability assessments for the specific properties based on the comparisons.

In yet a further embodiment, the invention is a computer program product comprising a computer readable storage medium having computer program logic recorded thereon for enabling a processor to analyze hyperspectral images to determine roof condition to determine property liability, said computer program logic having a receiving procedure for receiving spectral images and aerial photography of a geographic area, a modeling procedure for building a model of the geographic area and identifying roof objects from the aerial photography, an analyzing procedure for comparing spectral images of an identified roof object with spectral information stored in a database, an associating procedure for associating roof objects with geographic identifications of specific properties and a reporting procedure for developing property liability assessments for the specific properties based on the comparisons.

DESCRIPTION OF THE DRAWINGS

Features of example implementations of the invention will become apparent from the description, the claims, and the accompanying drawings in which:

DETAILED DESCRIPTION

A first embodiment of the system and method of the invention uses remote sensing to collect environmental attributes and to verify structural attributes and environmental data that are important factors in understanding insurance property risk. Using an airborne spectral imager, visible to shortwave infrared reflected radiation from rooftop material can be collected and compared with reference data on reflectance changes with time and exposure. This allows for the distinction of new versus aged and worn roof conditions. Spectral image classification of rooftop conditions using remote sensing provides a method for efficiently mapping a broad geographic distribution of urban/suburban buildings to characterize the state of rooftop material and other property attributes that are of interest for property value assessment. Classification of rooftop spectra demonstrate unique changes with age and exposure to environmental impacts, along with inadequate ventilation, that allow the quantification of roof condition to be determined. Classification of the spectral reflectance confirms the unique signatures of significant hail strikes, wet shingles, and vegetation on roofs, allowing the determination of the events having impacted on rooftops. Mapping urban environments with HSI (or other high spectral resolution imager) further allows the classification of all materials in the area, providing a means of characterizing vegetation types, the condition of water reservoirs, and other targets of interest for risk and property insurance assessment.

Figure 1:
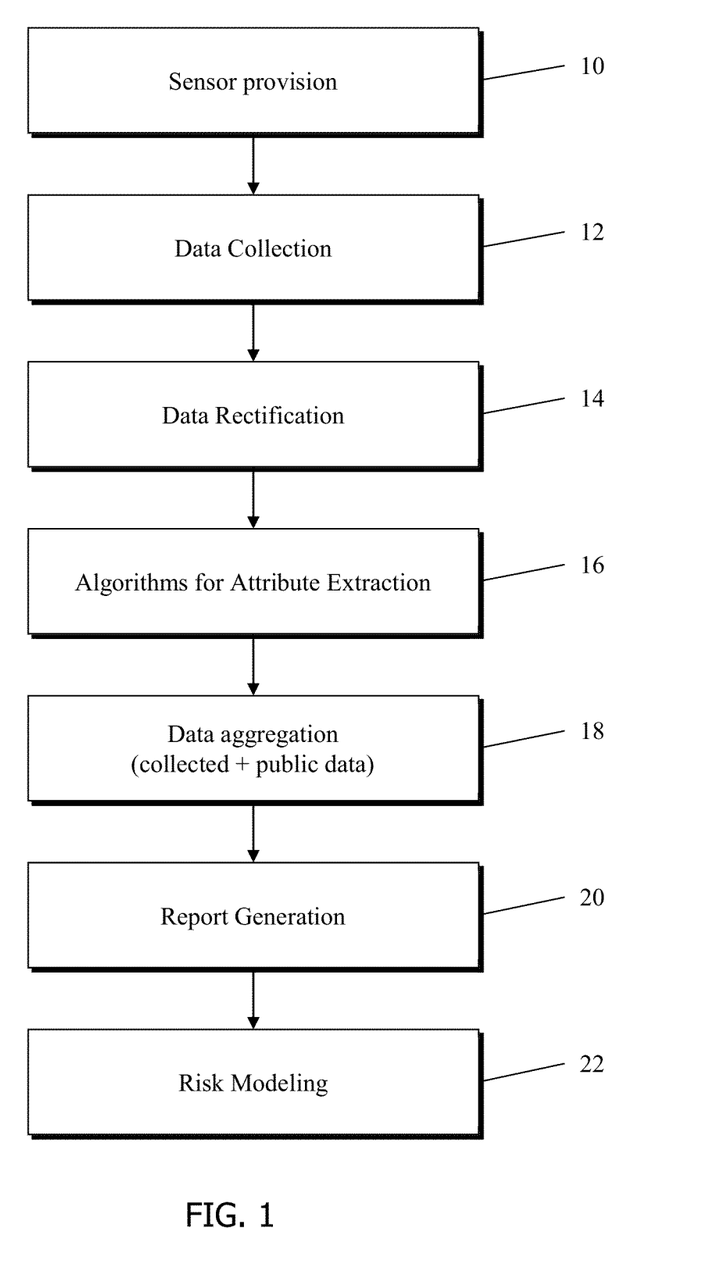
FIG. 1 is a flowchart of an embodiment of a method for providing property condition information for liability insurance.

An overview of a first embodiment of the invention is shown in FIG. 1. This figure shows the method of collecting data, processing it and providing reports for use in writing insurance policies. At step 10, sensors, for example, HSI/MSI, LADAR, LiDAR and/or SAR, are mounted on an airborne platform. At step 12, the platform is flown over a geographic area of interest to collect data on environmental attributes. Next, at step 14, the data is rectified by a series of processes that correct for radiometric, atmospheric, and geospatial attributes tied to the aerial data. At step 16, algorithms are run that extract regions of interest and characterize them with geospatial and spectral references to identify specific targets of interest like rooftops, vegetation, pools, reservoirs, etc. Data aggregation step 18 involves associating tagged areas with geo coordinates, parcel info, etc for use in report generation step 20. Results can be reported, for example, in the form or maps and data tables that give an assessment of conditions, as well as being stored in a digital database or geodatabase with associated metadata. Finally, in step 22, the risk associated with selected features in the geographic area of interest is assessed by the insurance practitioner.

Figure 2:
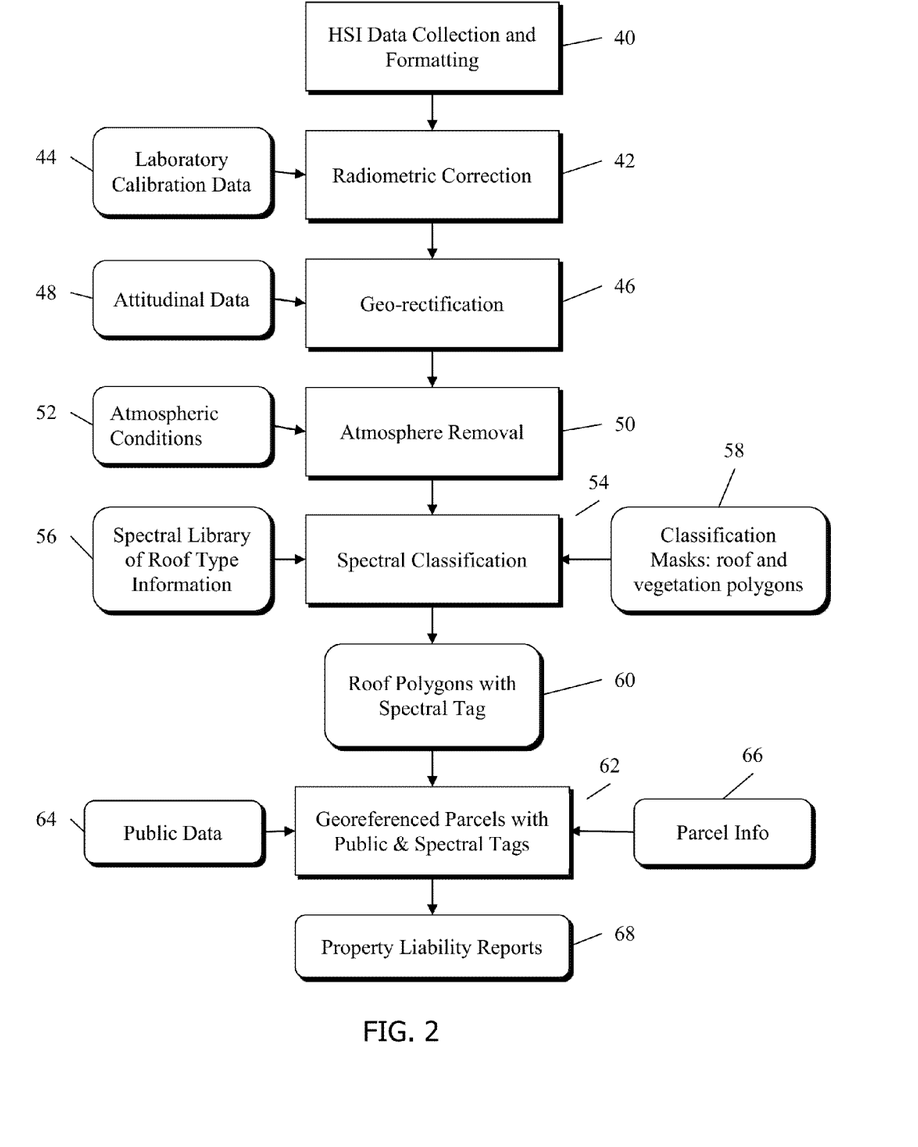
FIG. 2 is a more detailed flowchart of the method of FIG. 1 with further details of the way in which hyperspectral image data is processed to provide property condition.

More details on the process of FIG. 1 are shown in FIG. 2. In step 40, data is collected and formatted. In a preferred embodiment, this data is hyperspectral imaging (HSI) data. It can also incorporate MSI (MultiSpectral Imaging), LIDAR (Light Detection And Ranging), LADAR (Laser Detection and Ranging) and SAR (Synthetic-Aperture Radar). One of ordinary skill in the art would understand that HSI data is typically formatted as a datacube (spectral response across one axis with geospatial information across two axes) and associated with basic metadata such as time and geoposition using inertial navigation (IMU) information. At step 42, radiometric correction is performed on the collected data using laboratory calibration data 44. This correction gives a scale to the pixel values, e.g. the monochromatic scale of 0 to 255 will be converted to actual radiance values. In step 46, the HSI data undergoes a process of geo-rectification using the tagged IMU geo coordinates and attitudinal data 48. This process aligns image data to a set of geographical coordinates so that each pixel is assigned a geographical coordinate.

Step 50 involves processing the HSI data to remove elements due to atmospheric conditions. This uses data 52 which indicates, for example atmospheric aerosol properties and meteorological lookup values for given geographic locations and times of year. It may also incorporate sun and sky radiances at a number of fixed wavelengths within the visible and near-infrared spectrum or other data that indicates atmospheric conditions. The atmospheric correction can utilize a number of public/commercial software solutions, such as MODTRAN, ACORN, FLAASH, or modified radiation transfer code.

Step 54 involves spectral classification of the HSI data. Step 54 uses a spectral library of roof type information 56 that has information on the changes in spectral images of various surfaces over time. Spectral analysis can use a number of common methodologies available through commercial software, such as ENVI (Environment for Visualizing Images) using Spectral Angel Mapper, Endmember Analysis or embodiments of the many algorithms published on spectral analysis, from Principle Component Analysis to other image classification algorithms. Spectral analysis can be carried out in an automated processing or batch processing methodology. A well developed and controlled spectral library is crucial for the accuracy of determining the type and condition of the roof materials. A spectral library containing the spectra of the most commonly manufactured materials in both new and weathered states must be used to classify the airborne HSI imagery. Altogether, step 54 utilizes the crucial roof spectral reference database 56 to detect roof condition from the HSI remote sensing imagery.

Alternatively, step 54 can use an inversion of the spectral rooftop library 56 to create the library simulated to the atmospheric conditions for which the airborne data have been collected. The spectral analysis is then carried out across the airborne data using the appropriately simulated reference library, accounting for meteorological conditions, location, and time of year. The inverse spectral analysis is a powerful alternative, allowing the well controlled reference spectral library to be atmospherically inverted and compared against the remote sensing imagery without needing to correct the larger volume of airborne data for atmospheric distortions.

Step 54 also associates the HSI data with classification targets or masks 58 including roof polygons and vegetation polygons, through a process of object classification or geospatial analysis and segmentation. The segmented targets are derived from orthophotos collected along with the HSI data often at higher GSD than the HSI, or polygons derived from the HSI data itself. The geospatial polygon maps isolate the locations of the geometrically corrected ("orthorectified") images to focus the spectral image analysis on individual target locations which are uniquely numerically identified. This results in a set of Roof Polygons with spectral tags at 60.

In step 62, the roof polygons are associated with public data, for example, addresses and parcel info, to provide a georeferenced data set. Finally, in step 68, property liability reports are generated. These can include any combination of maps, reports or other data formats and can be targeted for different kinds of liability, such as wind, flood, and fire phenomenology and risk assessment.

An embodiment of the process in step 62 can also load the final imagery into a geospatial database and web server that can overlay the public datasets with the analyzed aerial imagery and property Analysis. This creates a convenient web based access point for utilization and exploitation of imagery and extracted variables including, but not limited to, the roof type and condition.

While the above example has been given in terms of assessing rooftop conditions, the system is equally applicable to vegetation and other features of a landscape. For example, dry trees and brush very close to a home pose a greater fire risk than moist healthy trees located 150 ft from a home. Spectral reference libraries for vegetation condition would be used for this type of analysis and have been commonly created in the ecosystem forest research communities and by agencies such as the US Geological Service (USGS). The combination of verified structural attributes and additional risk insight will help insurance companies price their policies, reduce expenses and limit volatility.

Figure 3A:
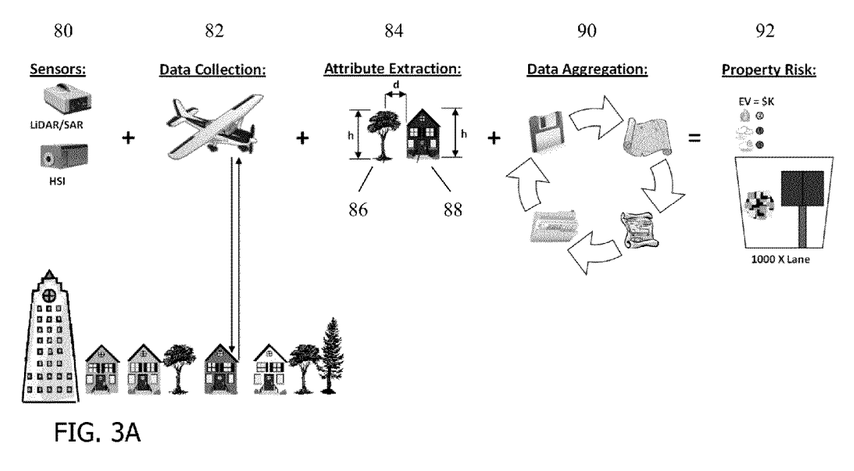
FIG. 3A is schematic diagram of the operation of an apparatus for implementing the method of FIGS. 1 and 2.

FIG. 3A depicts a schematic diagram of the operation of an apparatus for accomplishing an embodiment of the present invention. This apparatus includes sensors such as HSI/MSI and/or LIDAR/SAR 80 mounted on an airborne platform 82. Attribute extraction is performed by means of computer processing software and hardware at 84. For example, the attribute extraction hardware and software can detect that tree 86 is a 45 foot tall oak tree with a crown diameter of 60 feet that is approximately 50 years old. It can also determine its moisture content is 40% and its overall health is good. Attribute extraction can also determine the area of house 88 as being 1200 sq. feet, its height at 40 feet and its roof material as being asphalt approximately 15 years old. The same or additional computer processing software and hardware aggregates the data at 90. Finally reports are displayed to a user of the system at 92. Data analysis can be done in real-time or using post processing on the ground after airborne data has been collected. One of ordinary skill in the art would appreciate that any appropriate combination of software and hardware elements could be arranged to accomplish the present invention.

Figure 3B:
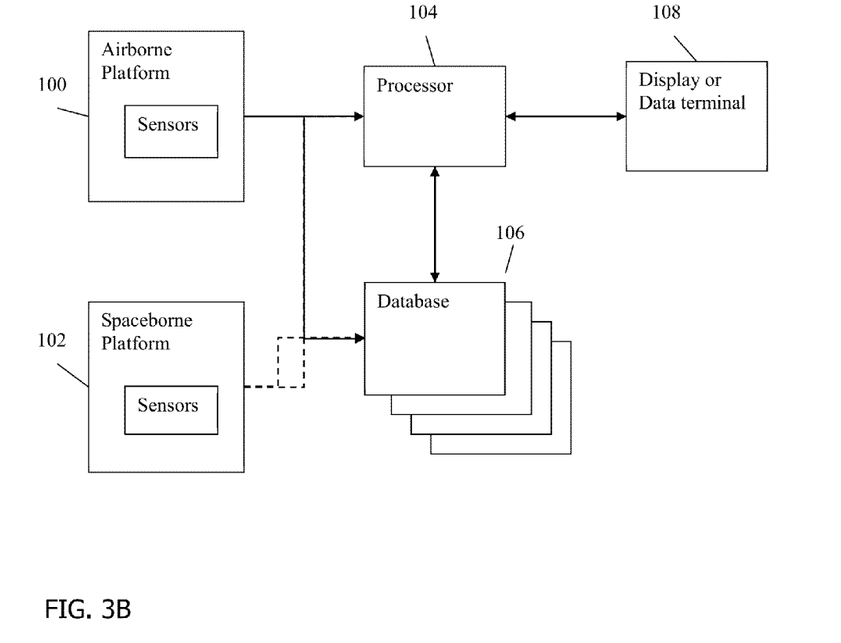
FIG. 3B is block diagram of an apparatus for implementing the method of FIGS. 1 and 2.

A representative arrangement of computer elements is shown in FIG. 3B. Airborne platform 100 contains sensors that collect spectral images and other information to send to processor 104 and/or one or more databases 106. Processor 104 may or may not be located on the airborne platform. Processor 104 performs the method of claim 2 by accessing one or more databases 106 which store the information 44, 48, 52, 56, 58, 60, 64 and 66 of FIG. 2. Finally, results of the processing are displayed on a display 108. This display can either be a monitor connected directly to processor 104, or a data terminal that accesses the results of processing by means of an internet-based connection. As an alternative, sensors can be mounted on a space borne platform 102. Since a space borne spectral imager will generate much lower GSD (5-50 m GSD pixel width which would not allow the discrimination of rooftops, which requires at least 1 m GSD), a space borne imager would need to use PAN sharpening or other high geospatial resolution to obtain spectral imagery at sub-meter to meter resolution for geographic area of interest. It would also require pixel unmixing because there would not be clean-pure pixels of the rooftop.

Data collection is accomplished by means of a number of components including, but not limited to, a ground control survey (survey-grade GPS), airborne GPS, an airborne inertial navigation system and airborne sensors. Ground control surveys are by no means required, but do increase the precision of orthorectification of the processed data.

Spectral Reference Database:

Spectral imaging can be used to detect changes in the condition of roof surfaces because there are unique spectral changes caused by the aging and weathering of roof materials. The spectral library requires extensive development to image the common leading manufactured roof materials in both new and weathered states. Spectral imaging must be done under uniform solar radiation with well controlled calibrations. Roofing material is obtained newly fabricated and imaged for type and brand. Weathered roof material is then obtained from real life samples that have been aged for a known period of time and exposure, which can either occur through simulation in laboratory settings or from accurate documentation of roof aging at actual properties. Altogether, the roof spectral database is crucial for differentiating roof condition from the HSI remote sensing imagery. Vegetation and other landscape features also show spectral changes in reflectance based on condition and composition. Airborne mapping of urban areas captures both residential and commercial properties to document roof condition, as well as vegetation and other hazards surround common structures. A well documented library of spectral images for vegetation, water quality, and other materials, such as trampoline mats, can be utilized to extract those aspects and document additional hazards or variables that impact property state and potential liability or intrinsic risk.

Further details of the present invention will be described in connection with FIG. 4-6.

The spectral signatures from a variety of real world samples representing residences with roofs in a mixture of worn conditions demonstrate the impact of age and weathering on spectral response. Roofs that were damaged and aged 10-30 years, often in the process of being replaced, when compared with the corresponding new roof material obtained from the leading roof contractors allowed for classification of spectral change as a unique marker for roof condition. Examples of the spectral response curves of new and aged/weathered roofs are shown in FIGS. 4-6. From this dataset it is possible to show the aging process for the dominant roof types used in residential homes.

Figure 4:
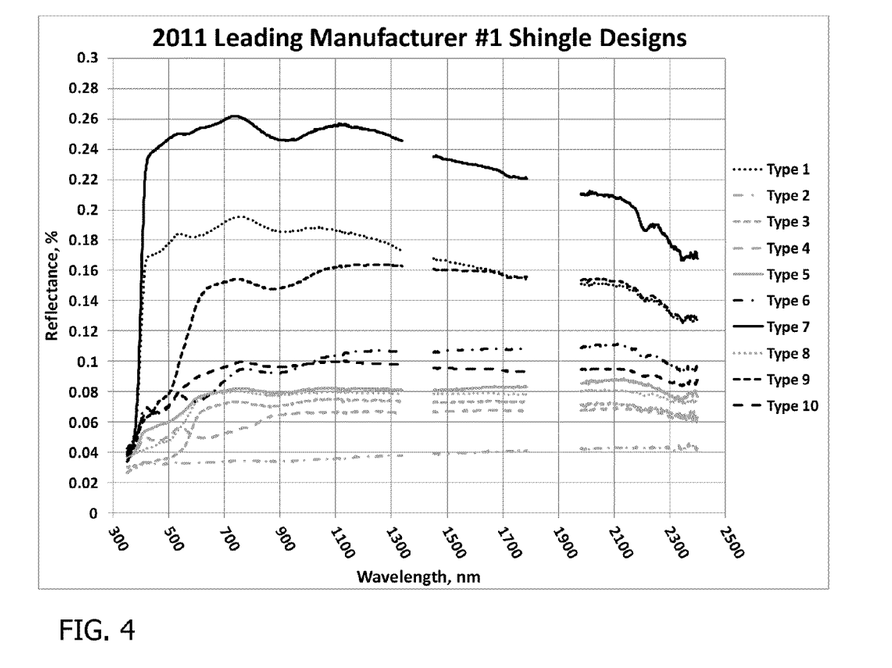
FIG. 4 is an illustration of the spectral response curves of new roofing materials from a single manufacturer.
Figure 5:
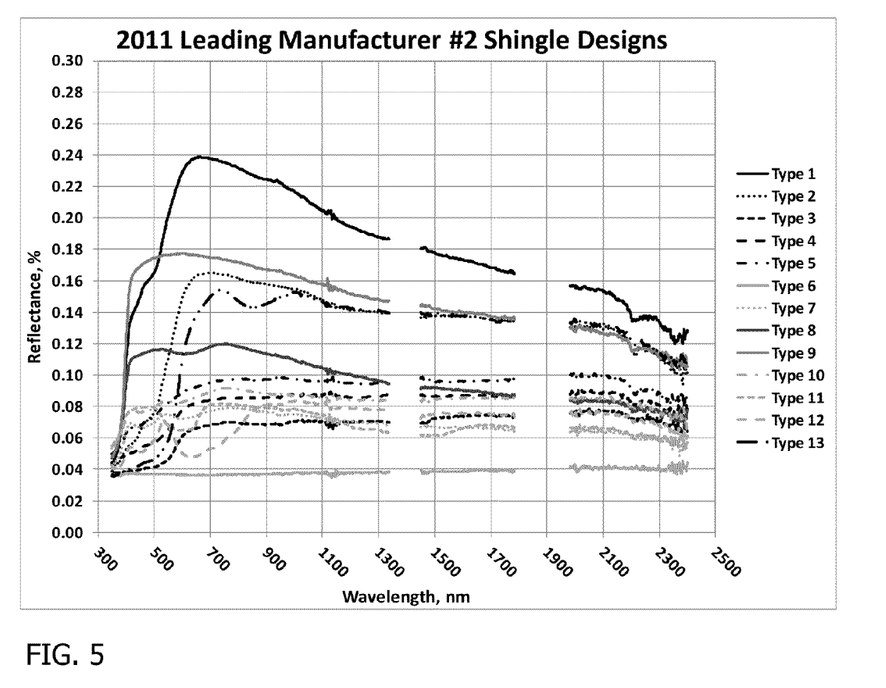
FIG. 5 is an illustration of the spectral response curves of new roofing materials from a different manufacturer than FIG. 4.

Results for the new roof samples, "standards," are shown in FIG. 4 for a variety of brands of asphalt shingles from a leading manufacturer. It can be seen from FIG. 4 that each type of shingle is distinct from another, with each possessing a unique spectral signature. It can also be seen that most of the shingle types have very low reflectivity under natural sunlight, approximately 400-700 nm. FIG. 5 shows the spectral signatures for a different manufacturer of asphalt shingles. Again the spectral signatures for different brands of shingles can be differentiated within a manufacturer and between separate manufacturers as the difference between FIG. 4 and FIG. 5 shows.

Figure 6:
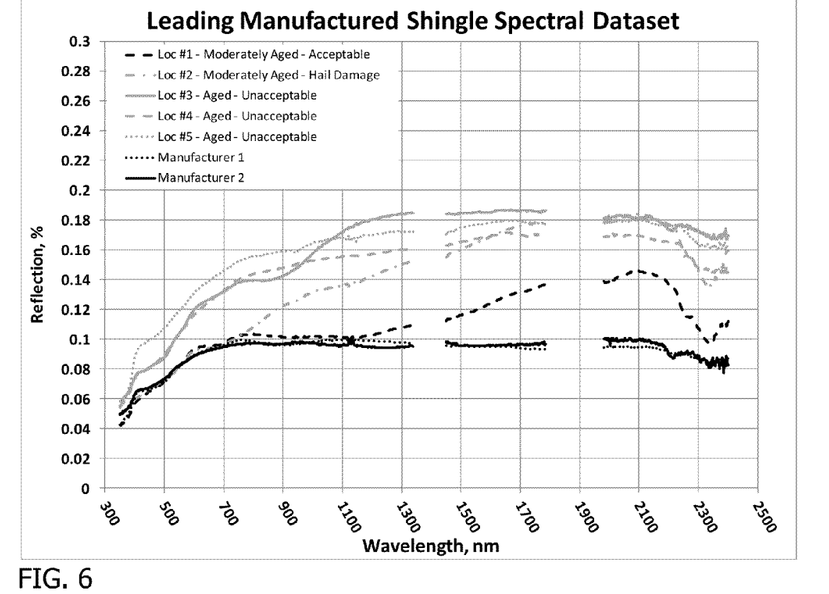
FIG. 6 is an illustration of the spectral response curves of roofing materials at varying states of wear.

FIG. 6 depicts samples of a single brand of shingle at various ages and conditions. Original manufacturer samples represent the standard reference data for new-unweathered data, while aged and weathered reference data were collected at residential properties and correlated with manual visual inspections and descriptive data for the length of time roofs had been exposed to the natural surroundings. Age and state of weathering was assessed for each rooftop with an in person visual inspection. The sample sets are identified by a location and a condition. The spectral signatures of FIG. 6 demonstrate that the roofs in a highly weathered condition all possess a much higher reflectivity in the SW-LWIR (Short Wave-Long Wave Infrared), 900-21000 nm, than the "new-standard" samples for this brand of rooftop material.

Distinct regions within the spectra contain identifying markers for each type of shingle (inflection points and slopes between wavelength bands), and the aging process changes the relative intensity from visible to infrared reflectivity. The two independent manufacturer brands in new condition are shown in FIG. 6 in the lowest part of the graph, (marked "Manufacturer 1" and "Manufacturer 2"), and show nearly identical spectra, with modest rise in reflectivity into the infrared. The two manufacturers collected represent over 90% of the market sampled for residential rooftop materials and many commercial markets across the United States. Two residences that were visited with medium amount of wear, with location #1 rated according to visual inspection as "moderately aged, but acceptable," while the location #2 was classified by visual inspection as "acceptable", but was being replaced for hail damage in a single quadrant. Both locations #1 and #2 show a moderate rise into the infrared, showing the gradual rise in SWIR as roofs age over 5-10 years. Aged spectra obtained at three separate residences at location #3, location #4, and location #5, all show significantly enhanced signatures into the infrared, while maintaining the unique pattern of the new standard samples. All "Aged" samples were unacceptable from an insurance liability standpoint and required replacement of roofing material.

Figure 7:
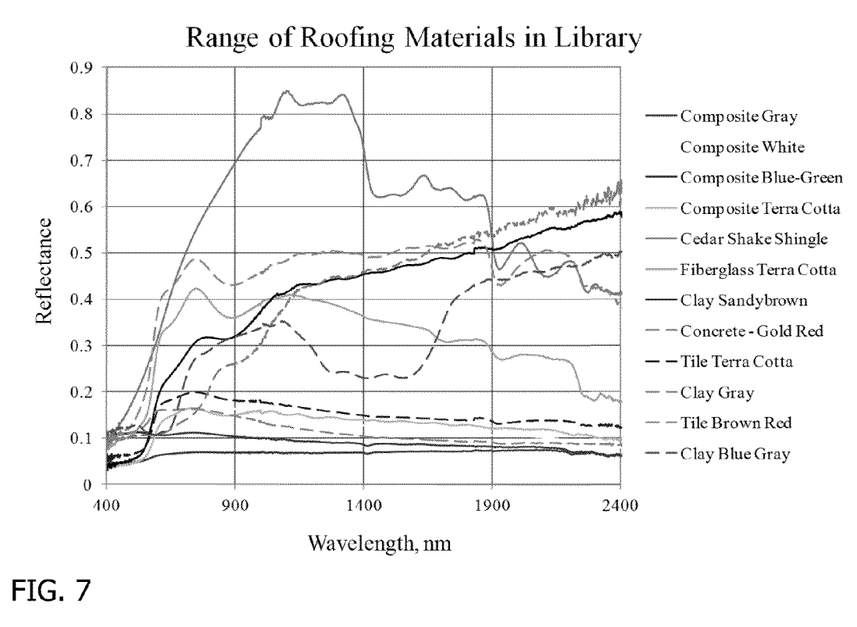
FIG. 7 is an illustration of the range of spectral response curves obtained from a large variety of roofing materials constituting part of a reference spectral library.

Additional details of the present invention are discussed with respect to FIG. 7

Roof materials beyond asphalt shingle can possess a range of spectral reflectances as shown in FIG. 7. Distinctive spectra are observed from composite shingle to wood shake, fiberglass, tile, and concrete roof materials. There are also a range of colors within the tile materials which help with classification and demonstrate clear difference in spectral reflectance with the impacts of aging and weathering.

There are additional factors that can have a great effect on the overall absolute reflectance of any object, especially objects with texture, one of which is BRDF (Bidirectional Reflectance Distribution Function). In particular, the minerals can throw shadows onto each other that are more or less part of the overall spectrum depending on illumination and observation angles, i.e. the BRDF. While it is tempting to compare absolute reflectivity of an entire spectrum or part of a spectrum, it is the spectrally relative reflectivity that is the signal of interest, the signal independent of illumination intensity or BRDF effects (assuming BRDF does not vary much across the spectral region of interest, which is generally the case for composite roofs).

The impact of shingle composition on spectral signature analysis will now be discussed.

Asphalt shingles are multilayered materials, where the asphalt is used as a waterproof barrier, with sheets of fiberglass or organic felts for strength. The solar reflectance of asphalt shingles is dominated by the layer of granules at the topmost surface. These granules are added in the manufacturing process, both to provide color to the finished shingle and to protect the asphalt from ultraviolet radiation (UV), which accelerates its degradation. Roofing shingles are typically composed of asphalt and fiberglass layers, with additional fillers. Specific compositions are usually considered proprietary to the manufacturers but an example is a composition having 20-45% granules, 25-45% limestone, 10-30% asphalt, 0-10% crystalline silica, and 1-3% fiberglass mat.

Roofing granules are typically comprised of varying materials including $TiO_2$, inorganic pigments, and ceramic. Some manufacturers coat various mineral grains with several layers of metal oxides. One formulation would be $TiO_2$, followed by pigments, sodium or potassium silicate, and an aluminosilicate such as kaolin. More typical formulations would be minerals coated by pigments and silicates, most often as a single layer. Any of these coated mineral grains needs to be fired to 500° C. or so to be stable. The coatings produced by these processes would be thick enough to dominate the optical properties, and approximate silicate/borosilicate/aluminosilicate minerals, which are used as further unique spectral library identifiers.

An important function of roofing granules in any asphalt roofing material is to reflect some fraction of the solar radiation, since the underlying black material is both degraded by UV light and is nearly a blackbody absorber. Various studies have examined the solar reflectance and thermal emittance of several asphalt roofing shingles, although the studies have not addressed the state of weathering.

Figure 8:
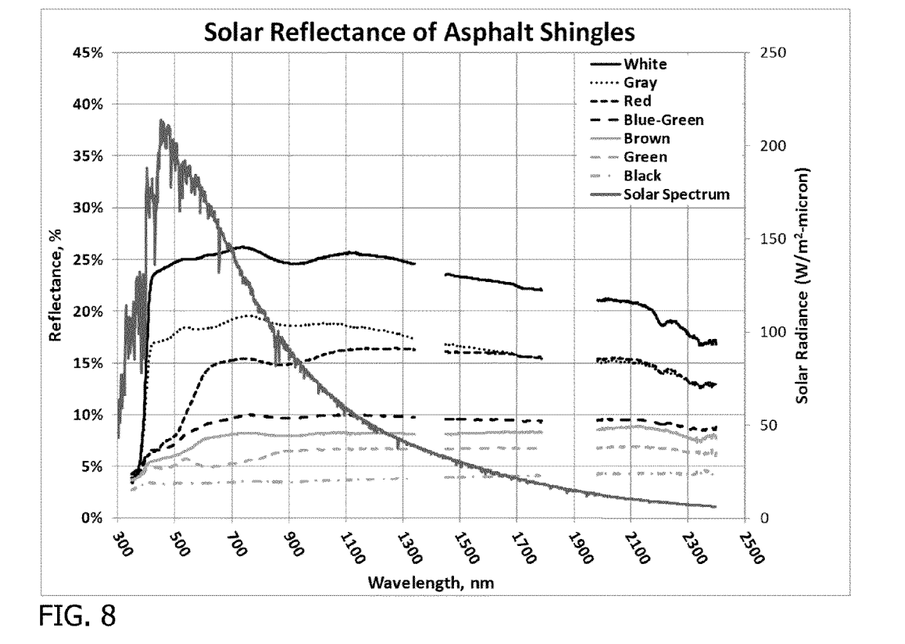
FIG. 8 is an illustration of solar reflection of roofing materials by color.

As expected, the solar reflectance for typical roofing shingles is dominated by color, with bright whites having solar reflectance as high as 0.4, and blacks having solar reflectance as low as 0.03. A plot of solar reflectance of asphalt shingles versus color, without reference to brand name or weathering is in FIG. 8.

Figure 9:
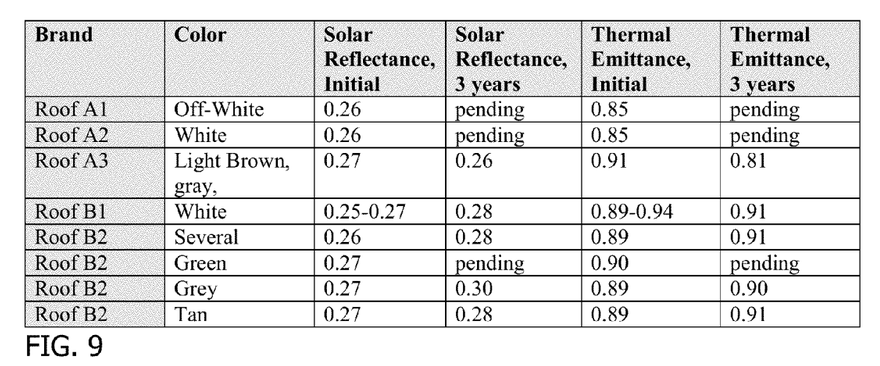
FIG. 9 is a table depicting solar reflectance and thermal emittance measurements of several different roofing materials.
Figure 10:
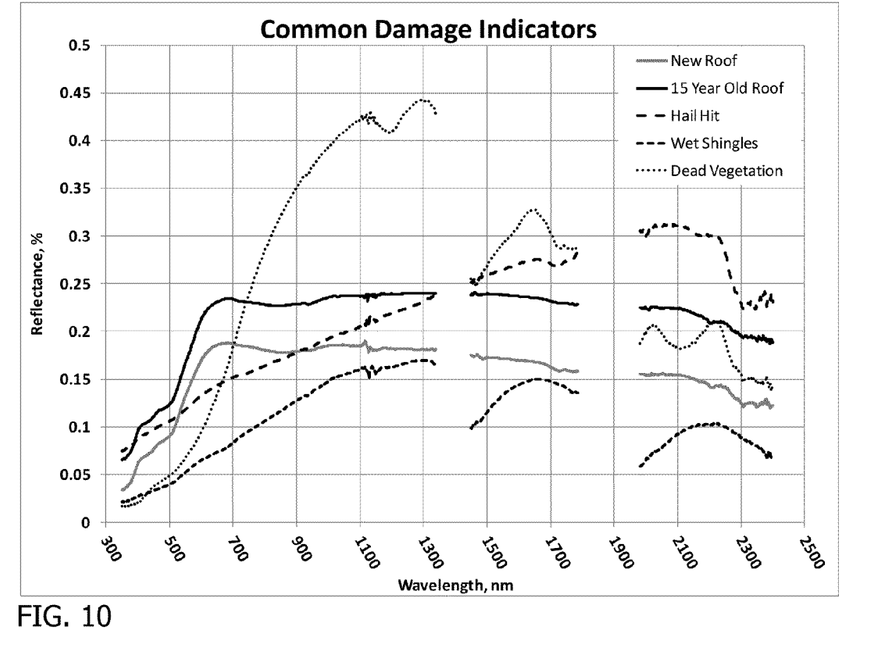
FIG. 10 is an illustration of a spectral library of damage indicators for a common type of roofing materials.

A number of roofing shingles have been certified by the Cool Roof Rating Council (CRRC). The solar reflectance and thermal emittance measurements used for the CRRC certification were made on asphalt roofing shingles initially, and after 3 years of weathering, and are in the table of FIG. 9. There are several aging mechanisms at work:

Mineral UV bleaching
Graying via fine dust and soot buildup
Water staining
Mineral loss
Bitumen loss of volatiles
Bitumen graying fine dust and soot buildup
Bitumen UV bleaching
Fiberglass showing through Each of these mechanisms adds together to produce the spectra observed, and each may not progress in a linear fashion. Indeed, each may compete in a sense to manifest the dominant spectral signature. A spectral library according to the present invention provides a comprehensive dataset of the impact of aging on rooftop spectra in composite as represented in FIG. 10. FIG. 10 also shows the significant impact of other damaging factors that present themselves in portions of the roof material and can be used to classify those specific damaging impacts, such as water on shingles, humus or dead vegetation buildup on shingles, and hail strikes exposing underlying fiberglass.

The apparatus of FIGS. 3A and 3B in one example comprises a plurality of components such as one or more of electronic components, hardware components, and computer software components. A number of such components can be combined or divided in the apparatus.

The apparatus of FIGS. 3A and 3B in one example employs one or more computer-readable signal-bearing media. The computer-readable signal-bearing media store software, firmware and/or assembly language for performing one or more portions of one or more implementations of the invention. The computer-readable signal-bearing medium in one example comprise one or more of a magnetic, electrical, optical, biological, and atomic data storage medium. For example, the computer-readable signal-bearing medium comprise, DVD-ROMs, Blue Ray discs, hard disk drives, Raid drives and other forms of electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for aerially assessing roof type and conditions in a geographic area to determine property liability, comprising the steps of:
    creating a database, coupled to a computer processor, of spectral information for roof materials found in the geographic area;
    building, by said computer processor, a model of the geographic area to identify roof objects using aerial photos;
    mapping the geographic area using an airborne hyperspectral or multi-spectral imager to collect high resolution aerial spectral images;
    measuring, by said computer processor, requisite geopositional data to accurately locate aerial imagery to geographic area of interest;
    analyzing, by said computer processor, the high resolution aerial spectral images to characterize the condition of roof objects according to the geographic property model by comparing the images with the reference spectral information from the database;
    associating, by said computer processor, the roof objects with geographic identifications of specific properties; and
    developing property liability assessments for the specific properties based on the comparisons.

2. The method of claim 1 wherein the spectral information comprises hyperspectral image (HSI) or multispectral (MSI) data.

3. The method of claim 1 wherein the database of spectral information further comprises data associating high resolution aerial spectral images with roof material from specific manufacturers.

4. The method of claim 1, wherein the mapping step is performed by a space borne spectral imager that uses PAN sharpening or other high geospatial resolution to obtain spectral imagery at sub-meter to meter resolution for geographic area of interest.

5. The method of claim 1 wherein the database of spectral information further comprises data associating high resolution aerial spectral images with spectral response curves indicating aging impacts on roof material.

6. The method of claim 5 wherein the database further comprises spectral response curves indicating weathering impacts, vegetation impacts, storm impacts and solar radiation impacts on roof material.

7. A system for assessing roof conditions to determine property liability comprising:
one or more databases for storing spectral information for roof materials, said spectral information including at least one of aging impacts on roof material, weathering impacts on roof material, vegetation impacts on roof material, storm impacts on roof material, or solar radiation impacts on roof material;
an airborne spectral imager for collecting spectral images of a geographic area;
a processor for building a geospatial model of the geographic area to identify roof objects, for analyzing the spectral images to characterize the condition of roof objects identified by the model by comparing the roof objects with reference spectral information stored in the database, associating the roof objects with geographic identifications of specific properties and for developing property liability assessments based on the comparisons.

8. The system of claim 7, wherein the airborne spectral imager is a spaceborne spectral imager that uses PAN sharpening or other high geospatial resolution to obtain spectral imagery at sub-meter to meter resolution for geographic area.

9. The system of claim 7 further comprising:
a display, coupled to the processor, for presenting the property liability assessments to a user of the system.

10. The system of claim 9 wherein the property liability assessments further comprise one or more of reports, maps and data tables.

11. The system of claim 7 wherein the spectral images comprises hyperspectral image (HSI) or multispectral image (MSI) data.

12. A property insurance liability assessment business method comprising the steps of:
creating a database, coupled to a computer processor, of spectral information for roof materials found in the geographic area;
building, by said computer processor, a model of the geographic area to identify roof objects using digital aerial photography;
mapping the geographic area using an airborne spectral imager to collect hyperspectral images;
analyzing, by said computer processor, spectral images to characterize the condition of roof objects according to the model by comparing the spectral images with the reference spectral information from the database;
associating, by said computer processor, the roof objects with geographic identifications of specific properties; and
developing property liability assessments for the specific properties based on the comparisons.

13. The method of claim 12 wherein the spectral images comprise hyperspectral image (HSI) or multispectral (MSI) data.

14. The method of claim 12 wherein the database of spectral information further comprises data associating high resolution aerial spectral images with roof material from specific manufacturers.

15. The method of claim 12, wherein the mapping step is performed by a space borne spectral imager that uses PAN sharpening or other high geospatial resolution to obtain spectral imagery at sub-meter to meter resolution for geographic area of interest.

16. The method of claim 12 wherein the database of spectral information further comprises data associating high resolution aerial spectral images with spectral response curves indicating aging impacts on roof material.

17. The method of claim 16 wherein the database further comprises spectral response curves indicating weathering impacts, vegetation impacts, storm impacts and solar radiation impacts on roof material.

18. A computer program product comprising a non-transitory computer readable storage medium having computer program logic recorded thereon for enabling a processor to analyze hyperspectral images to determine roof condition to determine property liability, said computer program logic comprising:
a receiving procedure for receiving spectral images and aerial photography of a geographic area;
a modeling procedure for building a model of the geographic area and identifying roof objects from the aerial photography;
an analyzing procedure for comparing spectral images of an identified roof object with spectral information stored in a database;
an associating procedure for associating roof objects with geographic identifications of specific properties; and
a reporting procedure for developing property liability assessments for the specific properties based on the comparisons.

19. The computer program product of claim 18 wherein the spectral images comprise hyperspectral image (HSI) or multispectral image (MSI) data.

20. The computer program product of claim 18 wherein the reporting procedure further comprises procedures for generating reports in the form of maps or data tables.

\* \* \* \* \*